United States Patent
Drummond-Murray et al.

(10) Patent No.: US 6,999,452 B1
(45) Date of Patent: Feb. 14, 2006

(54) ETHERNET UNITS ADAPTED FOR LOOP CONFIGURATION AND METHOD OF OPERATING SAME

(75) Inventors: Justin A Drummond-Murray, Chorleywood (GB); Paul J Moran, Hemel Hempstead (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/511,118

(22) Filed: Feb. 23, 2000

(30) Foreign Application Priority Data

Dec. 16, 1999 (GB) .................................. 9929886

(51) Int. Cl.
*H04L 12/28* (2006.01)
*H04L 12/56* (2006.01)

(52) U.S. Cl. ...................... 370/389; 370/386; 370/387; 370/388; 370/396; 370/392; 370/395.32

(58) Field of Classification Search ................ 370/387, 370/388, 396, 400, 392, 403, 401, 402, 389, 370/360, 223, 224, 249, 358, 404, 405, 406, 370/452, 460, 386, 395.32, 428; 709/238
See application file for complete search history.

(56) References Cited

U.S. PATENT DOCUMENTS 5,442,632 A    8/1995  Burton et al.
6,331,985 B1 * 12/2001 Coden .......................... 370/403
6,490,276 B1 * 12/2002 Salett et al. ................. 370/360
6,546,010 B1 *  4/2003 Merchant et al. ........... 370/389
6,611,520 B1 *  8/2003 O'Keeffe et al. ........... 370/389
6,690,668 B1 *  2/2004 Szczepanek et al. ........ 370/392
6,757,279 B1 *  6/2004 Furlong et al. .............. 370/387
6,801,527 B1 * 10/2004 O'Keeffe et al. ........... 370/386
6,801,950 B1 * 10/2004 O'Keeffe et al. ........... 709/238

FOREIGN PATENT DOCUMENTS

EP          0996256 A2    4/2000

* cited by examiner

*Primary Examiner*—Wellington Chin
*Assistant Examiner*—Chuong Ho
(74) *Attorney, Agent, or Firm*—Nixon & Vanderhye P.C.

(57) ABSTRACT

A packet-switched network system comprises a multiplicity of multi-port network units each of which has first and second ports and other ports and transmission links coupling the first and second ports of said unit in a closed ring. The first and second ports and transmission links support duplex transmission of Ethernet data packets. Each unit transmits from said first and second ports packets including selected information enabling on reception of a packet at any of the units a determination of a number of hops from unit to unit around said ring said packet has made. Each unit has a forwarding database and in response to the said selected information controls the transmission of said packets in two directions around said ring, and each unit causes discard of packets which have according to said selected information circumnavigated the ring.

3 Claims, 6 Drawing Sheets

| Source Port | Lookup Result | Action | 802.1D Functionality |
|---|---|---|---|
| Front-Panel | Front-Panel | Transmit out Front-Panel Port | Same |
| Front-Panel | Ring Port 1 | Transmit out Ring port 1 | Same |
| Front-Panel | Ring Port 2 | Transmit out Ring port 2 | Same |
| Ring Port 1 | Front-Panel | Transmit out Front-Panel Port | Same |
| Ring Port 1 | Ring Port 1 | Transmit out Ring port 2 | Discard |
| Ring Port 1 | Ring Port 2 | Transmit out Ring port 2 | Same |
| Ring Port 2 | Front-Panel | Transmit out Front-Panel Port | Same |
| Ring Port 2 | Ring Port 1 | Transmit out Ring port 1 | Same |
| Ring Port 2 | Ring Port 2 | Transmit out Ring port 1 | Discard |

FIG.9

| Packet Type | Source Port | Action – send from: | 802.1D Functionality |
|---|---|---|---|
| Unicast Unknown | Front | Front-Panel & Ring Port 1 | Front-Panel & Ring Port 1 & 2 |
| Unicast Unknown | Ring Port 1 | Front-Panel & Ring Port 2 | Same |
| Unicast Unknown | Ring Port 2 | Front-Panel & Ring Port 1 | Same |
| Multicast | Front | Front-Panel & Ring Port 1 | Front-Panel & Ring Port 1 & 2 |
| Multicast | Ring Port 1 | Front-Panel & Ring Port 2 | Same |
| Multicast | Ring Port 2 | Front-Panel & Ring Port 1 | Same |
| Broadcast | Front | Front-Panel & Ring Port 1 | Front-Panel & Ring Port 1 & 2 |
| Broadcast | Ring Port 1 | Front-Panel & Ring Port 2 | Same |
| Broadcast | Ring Port 2 | Front-Panel & Ring Port 1 | Same |

ETHERNET UNITS ADAPTED FOR LOOP CONFIGURATION AND METHOD OF OPERATING SAME

FIELD OF THE INVENTION

This invention relates to packet-based communication networks and particularly to Ethernet networks operating, for example, according to the IEEE 802 1 transmission standards and revisions thereof.

The invention particularly relates to the connection of a multiplicity of similar multi-port network devices, such as switches, in a stack or ring so that for example a plurality of multi-port switches are connected together by means of a duplex ring to constitute in effect a switch of which the ports are constituted by the aggregate of all the ports on the individual switch devices.

The invention is particularly concerned with increasing the bandwidth available for the transmission of packets between the units so as to achieve full duplex working on the links between the units.

BACKGROUND TO THE INVENTION

It is known to connect network devices or units together in a stack and to provide a ring or cascade whereby packets received on one of the stacked units can be forwarded from a port on another of the units after traversing the ring or cascade. One example is described in copending application by Brewer et al, Ser. No. 09/207,655 filed 9 Dec. 1998, and incorporated by reference herein.

In that system and in other proposals for a ring connecting stacked units, packets may travel only in a single direction around the ring.

It is customary in network switches, the term including where appropriate devices such as bridges and routers, to establish by examination of the address data in incoming packets and by other procedures to be described a forwarding database which relates a destination address in a packet with related data, including for example the port number associated with that destination address, so that a packet which is received by the switch and includes that address will be forwarded from the correct port, usually after temporary storage within the switch. A forwarding database is normally compiled by relating the source address in a data packet with the port on which the packet was received, so that on reception of a packet which has as its destination address the learnt source address the forwarding database will provide the port number for the forwarding of that packet.

Forwarding databases are well known and employ either media access control addresses, as in 'bridges', or protocol addresses as in 'routers', or both. Recent examples are described in copending patent application Ser. Nos. 09/286,469 and 09/286,470 for O'Connell, filed 6 Apr. 1999.

Whatever the form of the forwarding database, if a packet is received and examination of that packet does not yield an entry for its destination address in the database, it is necessary to 'broadcast' that packet either to all the members of a network or to all the members in at least part of the network, when for example the network is artificially partitioned into 'virtual' local area networks. Furthermore, it is frequently necessary or desirable to forward a packet to more than one destination, this form of transmission being a multi-cast packet.

Links between network devices may be either half-duplex, where transmission in one sense only at a time is allowed, or full duplex, wherein simultaneous transmissions in both directions are permitted. Depending on the nature of the transmission medium, duplex working may require physically different lines between the ports connected by a duplex link. In any event, full duplex working inherently provides greater bandwidth and therefore greater information carrying capacity than a half-duplex link.

It is physically possible to connect a multiplicity of devices in a ring wherein all the links of the ring are full duplex, each device in the ring having two ports capable of duplex working, each of the ports being connected to a port on a respective other unit in the ring. However, such a connection has not hitherto been compatible with full duplex working, because, for example, 'broadcast' packets would continuously travel around the ring, producing a situation known as 'lock up' and preventing the flow of other traffic between the devices. It would however be desirable to be able to form an Ethernet ring with full duplex working around the ring since, as noted above, the full duplex working would increase the bandwidth and therefore the information-carrying capacity of the ring. Furthermore, such an arrangement, if feasible, would have the advantage that if one link failed in the loop there would remain a further connection between the devices and therefore data could still pass between the devices. Moreover, if one device failed, there would still remain a connection between all the other devices in the ring even though full duplex working around the ring could not be maintained. If existing configurations were used to provide the same functionality, then each device would require two connections, trunked together, to each of the devices adjacent to it. However, there would remain two end devices, conventionally termed 'top' and 'bottom' devices, which could not be connected together and if an intermediate device failed then the top and bottom devices would not possess connectivity with all the other devices.

The present invention therefore has the object of enabling a closed ring connection of Ethernet network devices (hereinafter called 'units') providing full duplex working around the ring that is to say on all the links between the units which are connected in the ring.

SUMMARY OF THE INVENTION

The invention is based on the modification of the forwarding rules for packets received by units in a ring in order to make full duplex working feasible. For this purpose a preferred feature of the invention is the insertion into these packets of data which enables the units to determine how many 'hops' (i.e. journeys between units) a packet has made.

The number of hops can be used within a unit to determine which port should be used to forward the packet on the ring and whether to discard the packet so as to prevent the aforementioned 'lock-up'.

One mechanism for identifying the number of hops, either directly by incrementing a hop number or indirectly by marking of the packet with a unit number, may be implemented by substitution of a VLAN tag header within the packet while it is within the closed system constituted by the units in the ring. While a packet is within that system, there is no need for a VLAN tag header and therefore the relevant field in the Ethernet packet may be employed as a special tag.

Other objects and advantages of the present invention will be apparent from the following description with reference to the accompanying drawings.

DETAILED DESCRIPTION OF PREFERRED EXAMPLE

Figure 1:
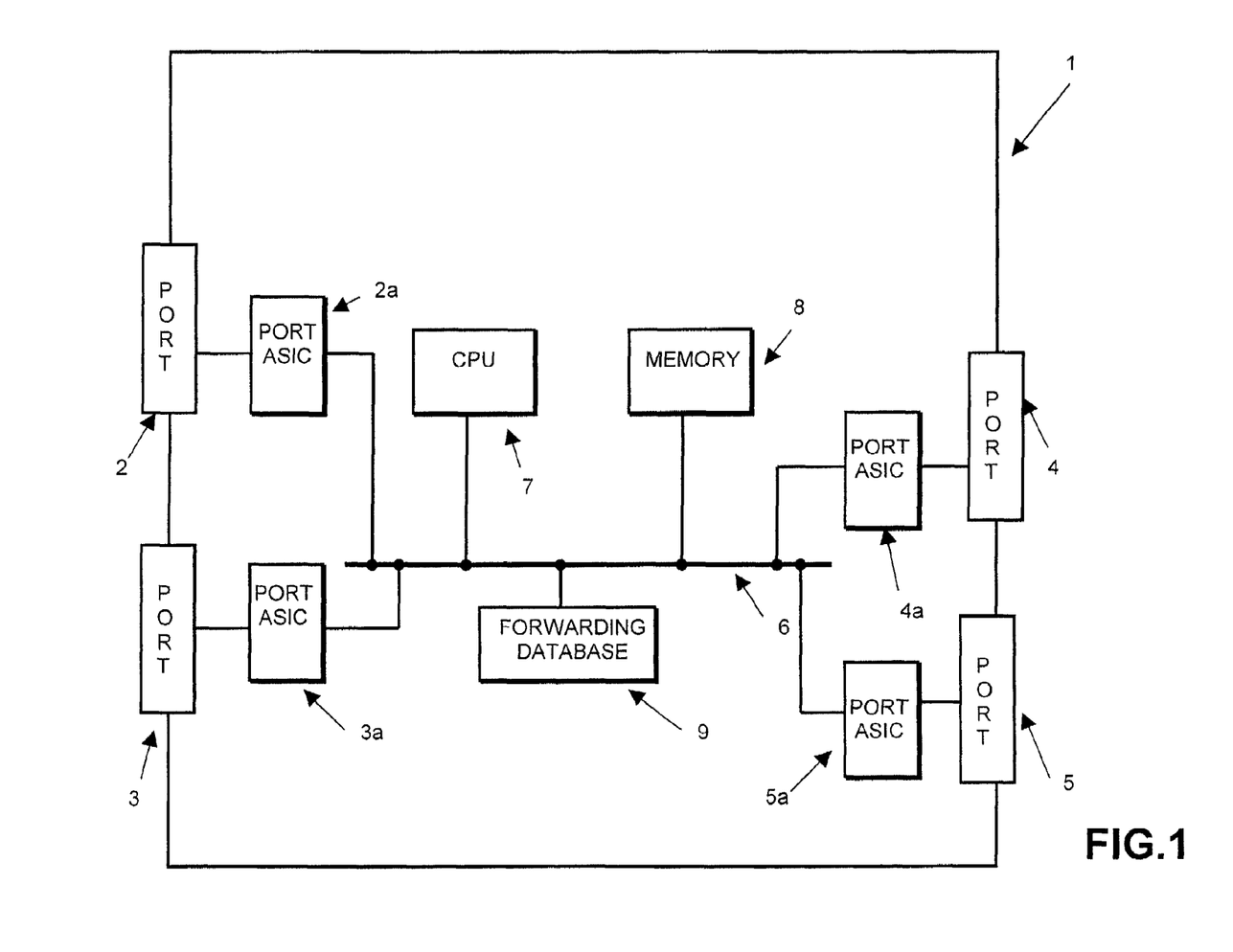
FIG. 1 is a schematic representation of an Ethernet network switch of the kind that may be employed in the present invention.

FIG. 1 of the drawings illustrates a known form of switch which may be employed as one of the units in an ring of (similar) units in accordance with the invention. The internal architecture of the switch 1 shown in FIG. 1 is not of any great importance to the invention.

The switch 1 typically has a multiplicity of ports. There may be for example up to about twenty-eight or thirty ports but in the simplified example shown the switch has ports 2 and 3, hereinafter described for convenience as 'front panel' ports, and two other ports 4 and 5. The ports are generally similar and are capable of full duplex working in known manner.

Each of the ports is associated with a port ASIC, 2a–5a respectively. Such an ASIC normally includes a media access control (MAC) and a physical layer device (PHY). The latter is employed to translate signals received from the medium to which the port is attached to a media independent format and vice versa and also to perform various other functions well known to those skilled in the art. The switch includes bus lines denoted 6, a central processor 7 and a memory 8 and a forwarding database 9. The memory 8 is normally employed for the storage of packets after they have been received and before they are forwarded. Typically the memory is composed of a multiplicity of buffers and the buffers may for example hold queues of packets, there being a queue for each output port. It is also possible, though not important for the present invention, to include some memory space within the port ASICs. The CPU is provided to execute a variety of programs stored in part of the memory 8 in order to control and manage the switch in accordance with known practice.

The switch 1 also includes a forwarding database 9 of the general type described above. This is employed for 'learning' destination addresses by the process of, typically, associating source addresses with port numbers by an examination of packets received by the switch.

As noted above, when 'unknown' addresses not the subject of an entry in the forwarding database are obtained, it is necessary to broadcast packets to all the addresses in at least part of the network in which the switch is connected. A response from a (protocol) address to the broadcast packet enables address resolution and the updating of the forwarding database such that subsequent packets which are intended for that protocol address do not need to be rebroadcast since the address will have been 'learned' in the database. A forwarding engine for this purpose may be provided in hardware (as described the aforementioned application Ser. No. 09/286,470 incorporated herein by reference) or in software executed by the CPU.

Figure 2:
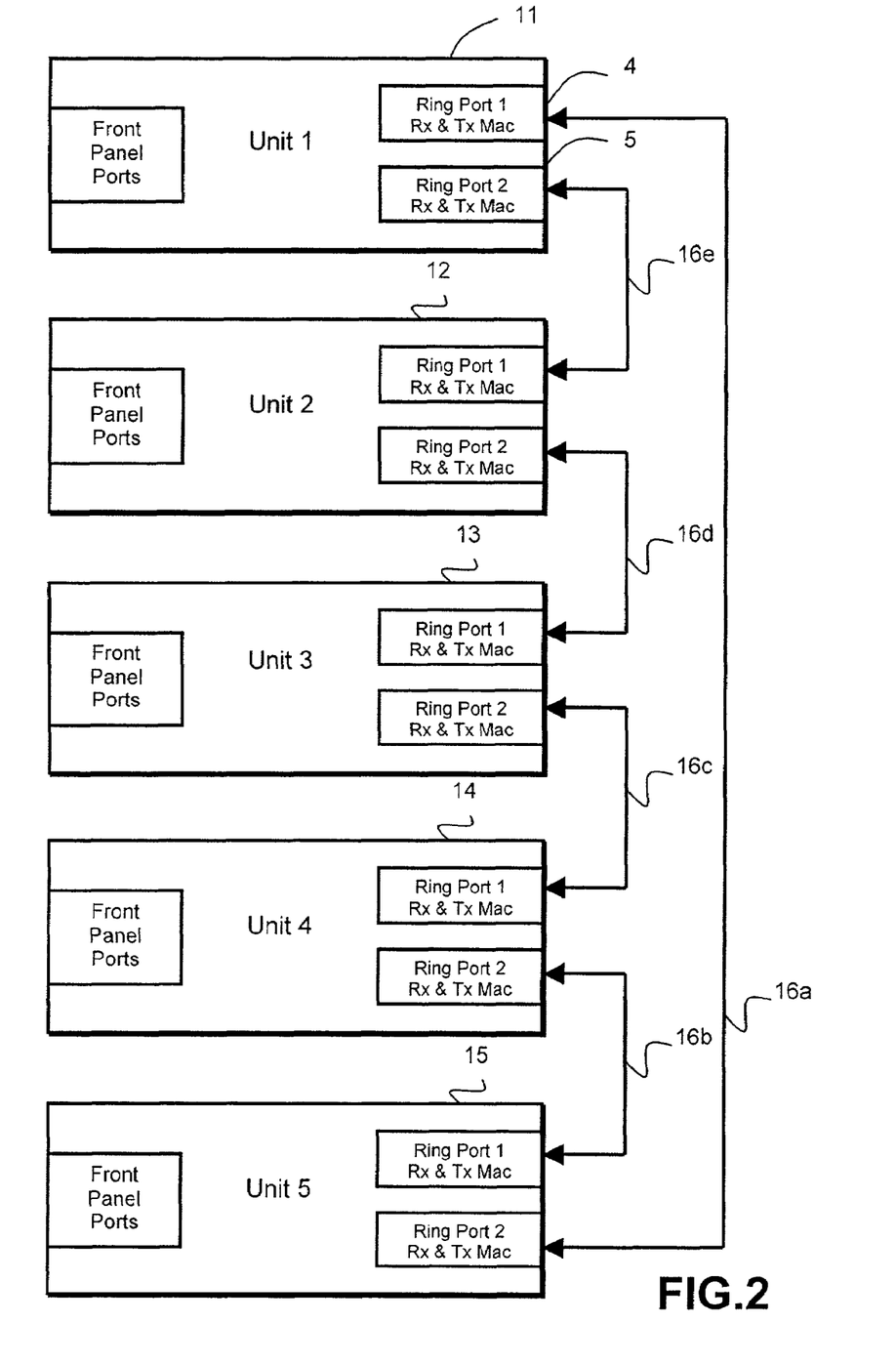
FIG. 2 illustrates a ring connection of switch units

FIG. 2 illustrates a ring connection of units of the kind to which the invention relates. In this example there are five units 11–15, each intended to be similar to the unit shown in FIG. 1*n* the present example, the ports 4 and 5 are each connected by a respective duplex link to a port of a respective one of the other units. The other ports on each of the units, such as ports 2 and 3, will be described collectively as the 'front panel' ports. It is convenient (though not necessary for the present invention) for units to have, literally, such ports as 2 and 3 on a front panel and ports intended for a ring connection somewhere else, for example a back panel, so as to facilitate the assembly of a ring.

Thus, in the arrangement shown in FIG. 2, port 4, herein called 'ring port 1' of switch unit 11 is coupled by a duplex link 16*a* to ring port 2 of unit 15. Ring port 1 on unit 15 is connected to ring port 2 on unit 14 by duplex link 16*b* and so on so that the individual links 16*a*, 16*b* etc form a ring 16 with the units 11 to 15.

As noted above, an arrangement shown in FIG. 2 is not operationally feasible when the links 16*a* to 16*e* and the relevant ports are all operational in a duplex mode and ordinary rules (such as those in IEEE 801 D) for forwarding packets apply. Thus part of the present invention is to make various modifications to the normal forwarding rules which the switch units would obey. These modifications need only be applied when the loop is complete. If the loop is broken at any time (as may be detected as described later) the system will preferably revert to normal forwarding rules.

A complete set of rules will be described with reference to FIGS. 7, 8 and 9. However, those rules need a mechanism which prevents the continuous looping of broadcast or multicast packets and therefore such a mechanism will be described first.

A feature of the present invention is the derivation of a distance which a packet has travelled around the loop consisting of the units and the links between them. The distance may be expressed as an integral number of 'hops', a hop being a traverse from one unit to another. There are broadly two methods of determining the distance travelled by a packet around a loop.

One method is to keep a hop count in the packet. When a packet is to be first transmitted from a ring port, for example Ring Port 1 of unit 11, the port ASIC may set a field in the packet to denote that the 'hop count' is unity. When the packet is received at unit 15 that unit can determine that the packet has made one hop. Each time the packet passes through a switch, the hop count may be incremented by unity. A means of inserting data representing hop count will be described later.

A second method is to mark the packet with a number representing the unit, each unit being numbered incrementally in one direction. A unit can then compare its 'box number' with the 'source number' to determine the number of hops that the packet has travelled. Thus for example, units 11 to 15 may be numbered '1' to '5', in the order in which they occur around the ring. If a packet arrived at a front panel port on unit 12, then before such packet is forwarded from one of the ring ports on unit 12 it would be provided with the number '2'. That number may be compared with the box number of another unit to determine the number hops. Thus when the packet arrives at ring port 1 of unit 15 it may be determined to have travelled three hops. On the other hand, if such a packet is received at ring port 2 of unit 15 then since the numbering is cyclic, modulo 5, it is known that it has made two hops. Either method may be used not only to determine which is the shorter way round the loop between the source unit and the unit at which a packet is received but also to determine whether the number of hops is equal to the perimeter (in terms of hops) of the ring.

More particularly, if the number of hops has been determined to be less than half the perimeter of the ring, then the port on which a packet arrives from the ring is closer to the point at which the packet was put onto the ring. If the number of hops is greater than the semi-perimeter then the other ring port is closer. A number of hops equal to the semi-perimeter is treated as less than the semi-perimeter but could be treated as greater than the semi-perimeter. If the number of hops is greater than the semi-perimeter then a packet arriving at one ring port of a unit should be sent out of the other port (if it is destined for another unit). If the number of hops equals the number of hops in the ring then the packet has come back to where it has started from and should be discarded to prevent its circulation.

Conveying hop or box number information in the packet may be achieved by a variety of means. One possibility is to employ the substitution of tag header fields in an Ethernet packet, as will be explained with reference to FIGS. 3 to 6. This substitution per se is described in co-pending application Ser. No. 09/417,102 filed 8 Sep. 1999 in names Parry et al.

Figures 3, 4:
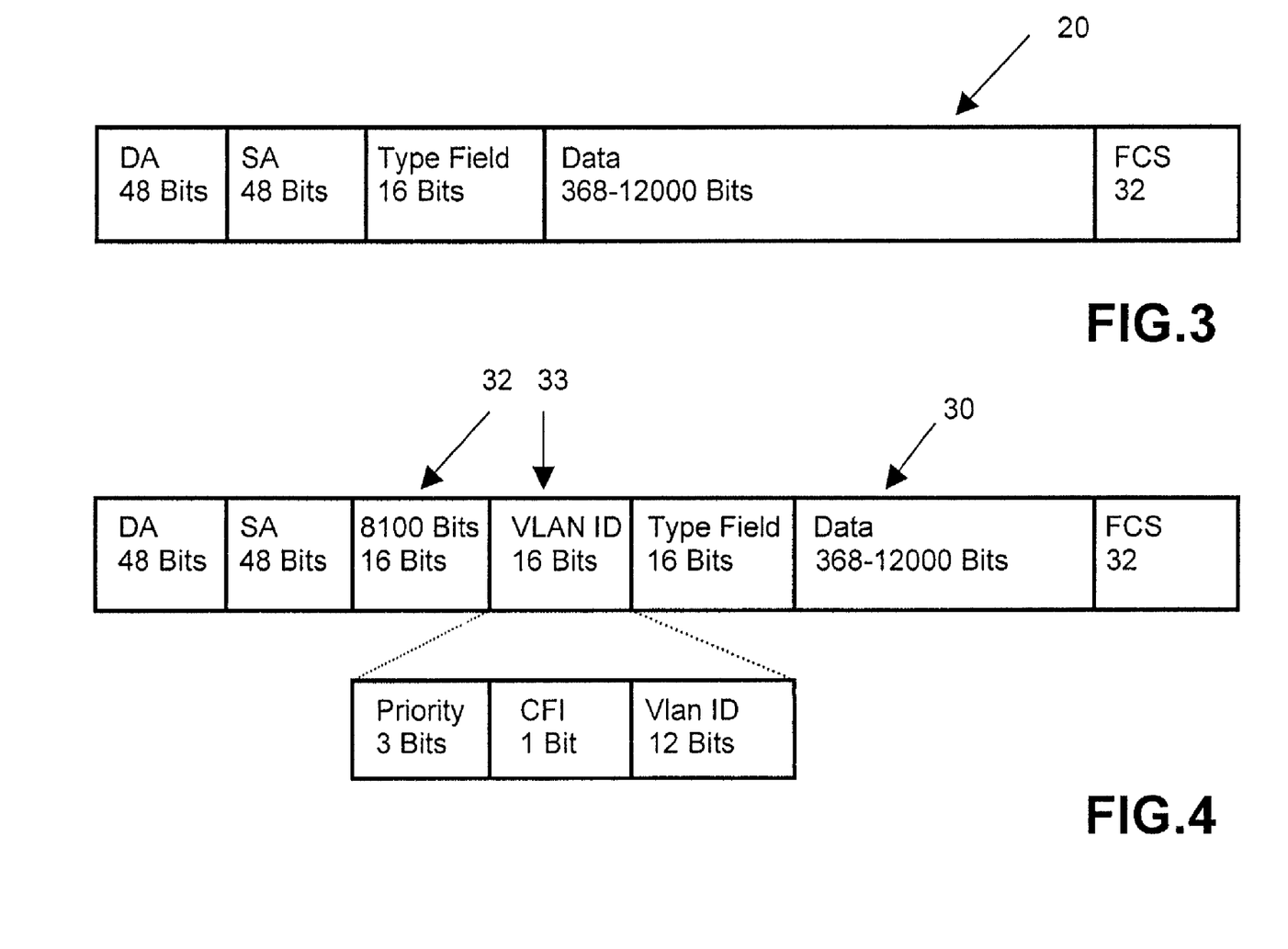
FIG. 3 illustrates an Ethernet packet.
FIG. 4 illustrates an Ethernet packet in greater detail.

FIG. 3 of the drawings illustrates the basic format 20 for all Ethernet packets, whether they are tagged or not. Ignoring certain starter frame and end of frame fields, the packet typically comprises, as it enters a device 1, a destination address DA, conventionally composed of a 48 bit word, a source address SA, likewise conventionally composed of a 48 bit word, a type field (16 bits), data, which in general may comprise from 368 to 12000 bits, and a frame check sum (32 bits). It is customary to tag a packet to include an identification of the virtual local area network relevant to the packet. As is well known from many publications, it is customary to partition artificially a physical local area network into a multiplicity of virtual local area networks so that, for example, if it is necessary to broadcast a packet, it is broadcast only to the devices which are defined to be within a respective virtual local area network. The division of a local area network into a multiplicity of virtual local area networks need not be exclusive; thus different virtual local area networks may overlap.

If a packet 30 is tagged as shown in FIG. 4 with VLAN identification, it customarily has a 'VLAN tag header' field 31, known as the 8100 field, which indicates that the VLAN tag is present. In particular, this enables interpretation of the next group 33 of 16 bits after the VLAN tag identifier as containing the VLAN information. The VLAN identification field 33 normally comprises, as shown in FIG. 3, a 3 bit priority field, a 1 bit CFI field and a 12 bit identification field. The next following 16 bits hold the original type field information. The only means for flagging that a VLAN tag is present is the 8100 type field. If any other value in a normal system is present in the type field the VLAN data would be taken as the first part of the packet data.

It may be appreciated that if a packet enters a system, e.g. at port 2 in FIG. 1, there is no need for the VLAN tag header while the packet remains within the system. Thus, the VLAN tag header may be replaced with some selected information, by the time it leaves the system by any of the front panel ports.

Figure 5:
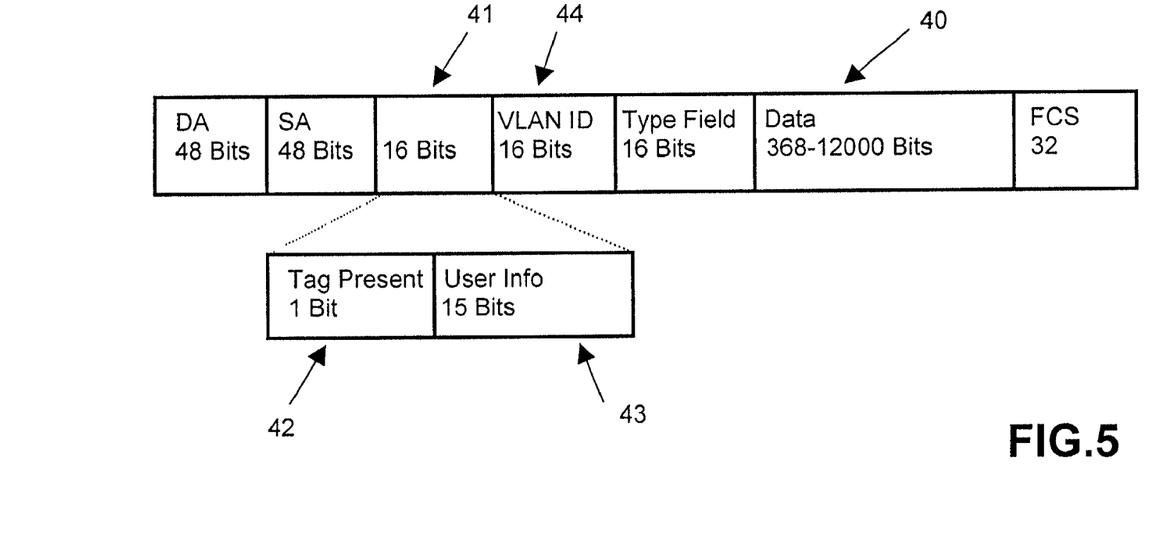
FIG. 5 illustrates the substitution of a field in an Ethernet packet with tagging information.
Figure 6:
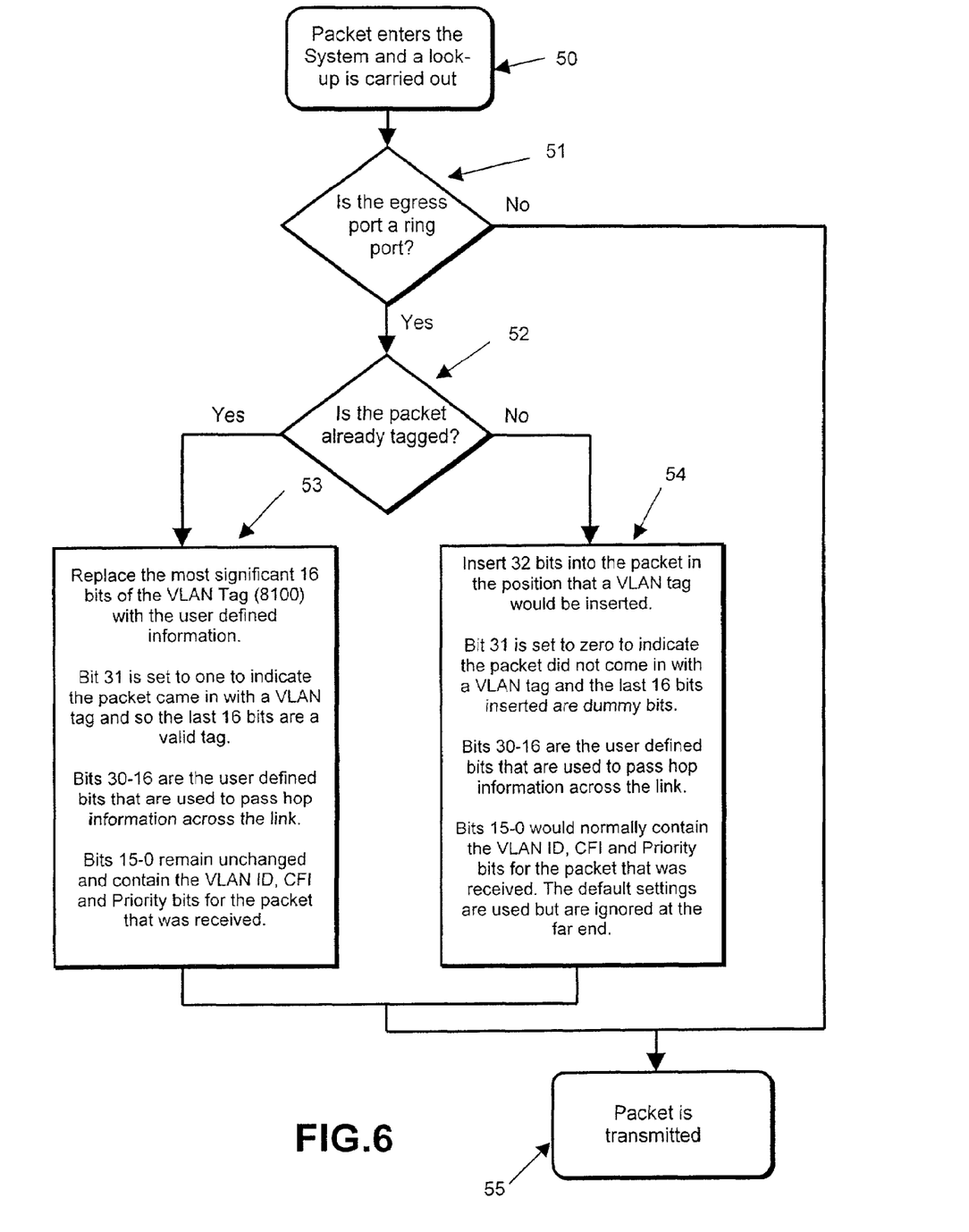
FIG. 6 illustrates a process for achieving the tagging shown in FIG. 5.

FIG. 5 illustrates a tagged packet 40. The VLAN tag identifier field 33 has been removed and a field 41 of the same length (16 bits) has been inserted. This conveniently comprises a 1-bit field 42 indicating whether the tag is present or not and a 15-bit tag field 43 which defines selected information. The 1-bit field represents a compression of the VLAN tag header fields. The selected information may include a field which indicates to the other units in the ring that the packet has come from a unit within the stack, in this case unit 11. As may be seen from FIG. 4, none of the necessary information is lost.

The field 41 may contain an identification such as the box number of the source unit within the ring. Additionally or alternatively it may contain a hop number, which would be set initially to '1'. In either case each unit that receives the packet from the source unit in the ring will easily be able to compute how many 'hops' the packet has made. If the system relies directly on hop numbers then each unit will increment the hop number of a packet received from a unit in the ring before retransmission of the packet from a ring port. This incrementing may be performed in the relevant port ASIC.

When a tagged packet is transmitted out of a front-panel port not connected to another unit in the system the tag header 42 and tag 43 will be removed by the respective port ASIC in favour of the standard VLAN tag identifier (8100) and then the packet will be in the same format as it was when it initially entered the system.

FIG. 5 is a summary of the tagging process applied to a packet entering the ring system by a front-panel port 1 and intended for transmission from a ring port. Stage 50 indicates the entry of the packet into the system, for example by any of the front-panel ports. Stage 51 will be performed after a look up determines whether the packet is intended for dispatch from any of the front-panel ports of the unit, and so will leave the system, or is intended for dispatch by a ring port. In the former case, modification of tagging does not apply and accordingly the packet is transmitted, as shown by stage 55. If the packet is to leave by a ring port, then further examination needs to be made to indicate whether the packet is already tagged. If the packet does not already have a VLAN tag, 32 bits must be inserted into the packet in the position where a VLAN tag would be inserted. The first bit, i.e. bit 31, will be set to 0 to indicate the packet did not come in with a VLAN tag and so the last 16 bits inserted will be dummy bits in the position which would be occupied by a VLAN tag 33. Bits 30 to 16 are the bits that are used to pass hop information across the link. Bits 15 to 0 would normally contain the VLAN identification, CFI and priority bits for the packets that were received.

If the packet already has a VLAN tag, then the most significant 16 bits of the VLAN tag will be replaced. Bit 31 (shown at 42) will be set to unity to indicate that the packet came in with a VLAN tag and so that the last 16 bits (44) represent a valid tag. Bits 30 to 16 of the user defined bits are used to pass proprietary information across the link. Bits 15 to 0 remain unchanged and as before contain the VLAN identification, CFI and priority bits for the packet that was received.

As briefly noted earlier it is desirable to provide some means for detection when the ring is complete (when the special forwarding rules will apply) and when it is incomplete or broken, when forwarding rules such as those in IEEE 802 1D may apply. It should be appreciated that the physical layer devices (PHYs) associated with the ports normally include auto-negotiation functions, as described for example in IEEE Standard 802.3, which include among other things a determination whether a link to a connected device exists. It is therefore feasible to include information on the status of links associated with a unit in the inserted tag field described with reference to FIGS. 5 and 6. Alternatively a higher level protocol may be used by a unit to pass link status information to other units.

The remodification of the packet as it leaves the system from a front-panel port requires only the replacement of the user defined bits 30 to 16 as well as bit 31 with the standard VLAN header tag (8100).

Figure 7:
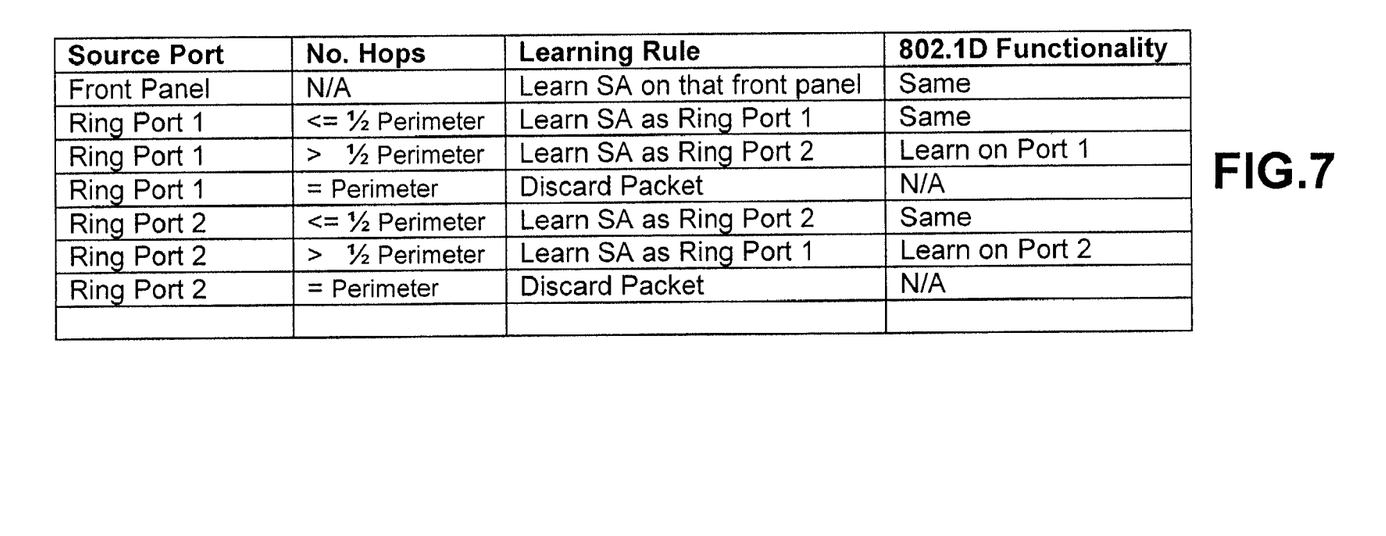
FIG. 7 illustrates learning rules for a ring in accordance with the present invention.

It is now feasible to discuss FIG. 7, which refers to the learning rules for the forwarding database of a unit. These rules make use of the hop information which is conveyed around the ring on the packets themselves.

FIG. 7 shows four columns, of which the first identifies a source port, that is to say a port on which a packet is received by one of the units. The second column relates to the number of hops, whether this is carried as an incremental count in the packets or indirectly as a box number which has to be compared with the box number of the unit. The third column specifies the preferred rule according to the invention. The fourth column provides for comparison the 'normal' rules according to IEEE Standard 801 1D.

If a packet enters by way of a front panel port, then obviously it has no hop information and the source address of the packet may be learnt for that front panel port.

If the source port is ring port 1, and the number of hops that the packet has made is equal to or less than the semi-perimeter of the ring, then the source address may be learnt as the ring port 1.

If however, a packet is received on ring port 1 but the number of hops indicated for that packet, directly or after computation, is greater than the semi-perimeter of the ring, the source address should be learned for ring port 2, because the source of the port is clearly closer to ring port 2 than it is to ring port 1. Herein lies a first difference between ordinary 802 1D functionality where the source address would be learned as ring port 1.

Finally, if a packet is received on ring port 1 and the number of hops indicated or computed for that packet is equal to the perimeter of the ring, the packet must be discarded. This has no counterpart in 802. 1D functionality. The remainder of FIG. 7 indicates for ring port 2 the same rules (mutatis mutandis) as apply for ring port 1.

Figure 8:
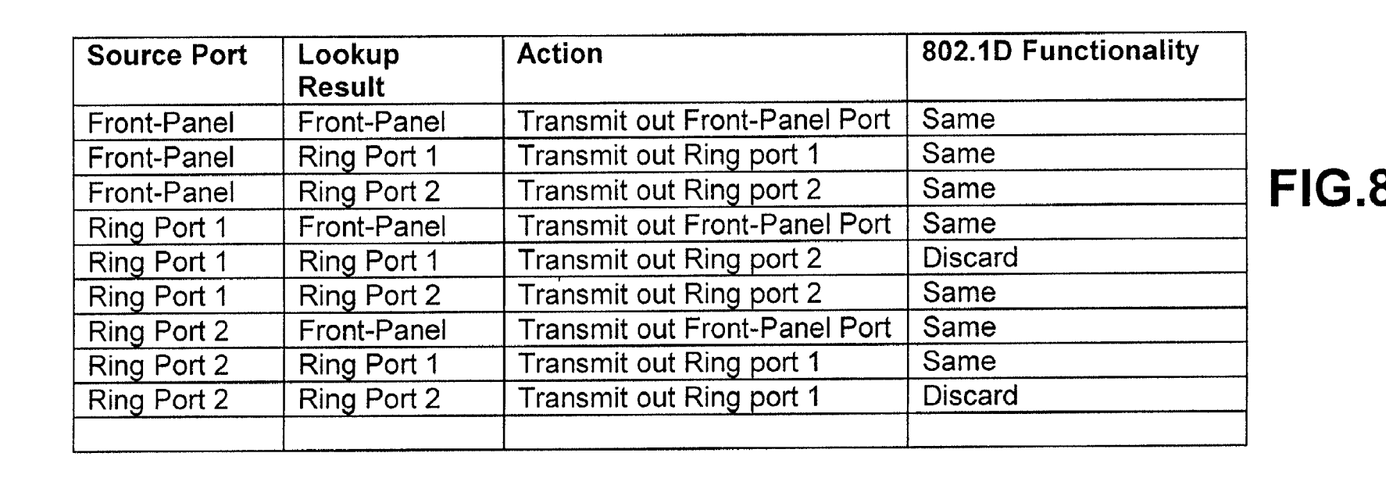
FIG. 8 illustrates transmission rules in accordance with the present invention.

FIG. 8 illustrates the operation of the look-up, that is to say the recourse to the forwarding database given a source port. Owing to the modified learning rules shown in FIG. 7, when a look-up is performed for a source port the look up result will not necessarily indicate the same port. Thus for example as shown in the third line of FIG. 7, when a packet has been received on ring port 1 but the source address has be learned as ring port 2, then notwithstanding the arrival of the packet on ring port 1, if the look up result shows that the packet should be forwarded on ring port 2, it must be transmitted from ring port 2. Furthermore, in order to maintain the flow of packets around a ring, if a packet is received on ring port 1 and the look up result provides ring port 1, it must be transmitted out of ring port 2 and vice versa.

Figure 9:
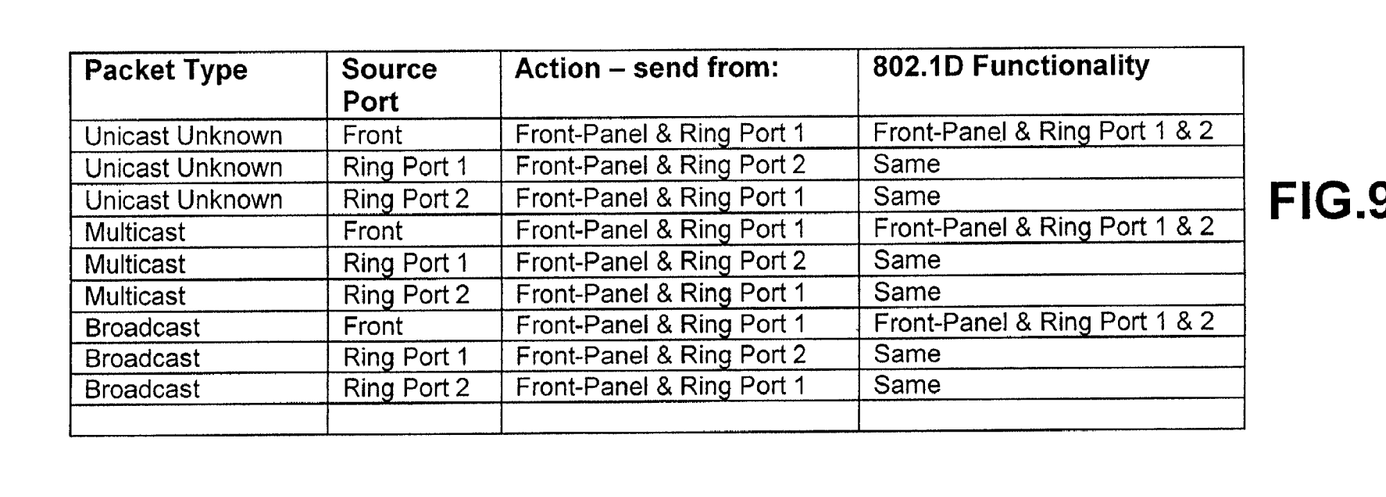
FIG. 9 illustrates the treatment of unicast, multicast and broadcast packets in accordance with the present invention

Thus FIGS. 7 and 8 illustrate the learning rules and the look-up rules which are necessary (a) to establish a flow of packets around the ring in both directions but also (b) to provide for discard of a packet which has circumnavigated the ring and preferably also (c) to provide a means for determining which unit is closest to a unit on which a packet has been received so as to utilize the bandwidth of the ring the more efficiently FIG. 9 illustrate the forwarding rules for three types of packet which do not have a known unique destination MAC address, namely unicast unknown, multicast and broadcast. Broadly, packets of all three types which were received at a front panel port would be broadcast from both the front panel and one of the ring ports of the same unit. If it were received at ring port 1 it would be forwarded from the front panel and ring port 2, if it were received on ring port 2 it would be forwarded from the front panel and ring port 1.

In the scheme shown in FIG. 9, only one ring port is employed to send a packet onto the ring. This prevents improper duplication of a packet. Instead of using a predetermined port (in this case port 1) it is possible to send out on one port (e.g. port 1) packets which have 'odd' source addresses and send out on the other port (e.g. port 2) packets which have 'even' source addresses.

What is claimed is:

1. A packet-switched network system comprising
   a multiplicity of multi-port network units each of which has first and second ports and other ports; and
   transmission links coupling the first and second ports of said units in a closed ring, said first and second ports and said transmission links supporting duplex transmission of data packets;
   wherein each unit transmits from said first and second ports packets including selected information enabling on reception of a packet at any of the units a determination of a number of hops from unit to unit around said ring said packet has made, each unit has a forwarding database and in response to the said selected information controls the transmission of said packets in two directions around said ring, and each unit causes discard of packets which have according to said selected information circumnavigated the ring; and
   wherein each unit includes means responsive to said selected information (i) to determine the number of hops from unit to unit around the ring a received packet has made; (ii) when the number is less than half the total number of hops around the ring, to learn a source address of the packet as that one of the said first and second ports at which the packet was received; (iii) when the number is greater than half the total number of hops around the ring, to learn a source address for the packet as that one of the first and second ports other than that at which the packet was received; and (iv) when the number is equal to the total number of hops around the ring, to cause discard of the packet.

2. A network unit comprising a multiplicity of ports including first and second ports for connection of said unit in a closed ring with other network units, said first and second ports supporting duplex transmission of data packets, said unit being operative:
   (a) to transmit from and receive at said first and second ports Ethernet packets including selected information enabling on reception of a packet at any of the units a determination of a number of hops from unit to unit around said ring said packet has made;
   (b) in response to the said selected information to control the transmission of said packets in two directions around said ring; and
   (c) to cause discard of packets which have according to said selected information circumnavigated the ring;
   wherein each unit includes means responsive to said selected information:
   (i) to determine the number of hops from unit to unit around the ring a received packet has made;
   (ii) when said number of hops is less than half the total number of hops around the ring, to learn a source address of the packet as that one of the said first and second ports at which the packet was received;

(iii) when the said number of hops is greater than half the total number of hops around the ring, to learn a source address for the packet as that one of the first and second ports other than that at which the packet was received; and (iv) when the said number of hops is equal to the total number of hops around the ring, to cause discard of the packet.

3. A method of operating a packet-switched network system comprising a multiplicity of multi-port network units each of which has first and second ports and other ports and transmission links coupling the first and second ports of the units in a closed ring, said first and second ports and said transmission links supporting duplex transmission of data packets, the method comprising:

transmitting from said first and second ports of each unit Ethernet packets including selected information enabling on reception of a packet at any of the units a determination of a number of hops from unit to unit around said ring said packet has made; controlling in response to the said selected information the transmission of said packets in two directions around said ring; and discarding packets which have according to said selected information circumnavigated the ring;

wherein said method includes:

(i) determining the number of hops from unit to unit around the ring a received packet has made;

(ii) when the number is less than half the total number of hops around the ring, learning the source address of the received packet as that one of the said first and second ports at which the packet was received;

(iii) when the number is greater than half the total number of hops around the ring, learning a source address for the received packet as that one of the first and second ports other than that at which the packet was received; and (iv) when the number is equal to the total number of hops around the ring, causing discard of the received packet.

* * * * *